United States Patent

Spence

[15] 3,699,539

[45] Oct. 17, 1972

[54] BOOTSTRAPPED INVERTER MEMORY CELL

[72] Inventor: John R. Spence, Villa Park, Calif.

[73] Assignee: North American Rockwell

[22] Filed: Dec. 16, 1970

[21] Appl. No.: 98,790

[52] U.S. Cl................340/173 R, 307/205, 307/238, 307/279, 340/173 CA

[51] Int. Cl..........................G11c 11/40, G11c 11/24

[58] Field of Search....340/173 R, 173 CA; 307/205, 307/238, 279

[56] References Cited

UNITED STATES PATENTS

| | | | |
|---|---|---|---|
| 3,581,292 | 5/1971 | Polkinghorn | 340/173 R |
| 3,576,571 | 4/1971 | Booher | 340/173 R |
| 3,618,053 | 11/1971 | Hudson et al. | 307/279 X |
| 3,582,909 | 6/1971 | Booher | 340/173 R |
| 3,355,721 | 11/1967 | Burns | 340/173 R |

*Primary Examiner*—Joseph F. Ruggiero
*Assistant Examiner*—James F. Gottman
*Attorney*—L. Lee Humphries, H. Fredrick Hamann and Robert G. Rogers

[57] ABSTRACT

A data storage cell in a matrix of storage cells is connected to a data input/output line (or between data input/output lines) for a plurality of the data cells. During a recurring write interval, a write field effect transistor is turned on for applying a voltage potential representing a logic state to a storage capacitor from the input/output line. During a recurring precharge interval, the data line is restored to a first voltage level. During a recurring read interval, a bootstrapped field effect transistor driver is turned on (or not) by the voltage stored on the capacitor for driving a read transistor. The bootstrapped drive provides a relatively high drive voltage on the gate electrode of the read field effect transistor when the bootstrapped driver is turned on. The stored voltage (data) is inverted in the storage cell by the conduction or nonconduction of the read field effect transistor and is provided as an output on the data line. The inverted data is reinverted and rewritten into the storage cell during the recurring write interval of a data refresh cycle following the read/write cycle. If new data is to be stored, the old data is blocked and the new data is written into the data cell.

13 Claims, 4 Drawing Figures

INVENTOR
JOHN R. SPENCE
BY Robert G. Rogers
ATTORNEY

INVENTOR
JOHN R. SPENCE
BY Robert G. Rogers
ATTORNEY

INVENTOR
JOHN R. SPENCE
BY Robert G. Rogers
ATTORNEY

INVENTOR
JOHN R. SPENCE
BY Robert G. Rogers
ATTORNEY

BOOTSTRAPPED INVERTER MEMORY CELL

BACKGROUND OF THE INVENTION

1. Field of the Invention

The invention relates to a bootstrapped inverter memory cell and more particularly to such a memory cell in which a first field effect transistor samples input data for controlling a bootstrapped driver connected to a second field effect transistor which provides inverted output data.

2. Description of Prior Art

One type of high speed read/write random access memory system (RAM) comprises a plurality of data connected in a matrix and includes logic for addressing individual cells. A common input/output line for each plurality of cells is precharged during an operating interval.

When an individual cell is addressed, a capacitor in the cell conditionally discharges the voltage on the data line as a function of the data stored in the cell. For example, assume the input/output data line is precharged to a voltage level representing logic "1" (true) such as -V, during an operating interval. During a subsequent interval, when the data cell is addressed, the data line either remains at -V or is discharged to a voltage lever representing a logic zero (false) such as electrical ground through a row address select transistor depending on whether or not a "1" or a "O" is being written into a data cell. At the same time, a write address signal actuates a write field effect transistor connected to the data line for enabling the voltage level to be stored on a capacitor having one plate connected to ground.

During the following operating interval, the data line is again precharged. When the read field effect transistor of an addressed cell is turned on during the read interval and if a logic one was previously stored in the data cell, a third field effect transistor is turned on in series with the read transistor for connecting the data line to electrical ground. If a logic zero had been stored in the data cell, the input/output data line would not be connected to electrical ground. The data cell inverts the stored data.

It is also well known that when a data cell is not addressed for a long period of time, the information stored on the capacitor or capacitors gradually leaks off. Therefore, the data stored in the cells is periodically restored or refreshed. One data refresh cell may be provided for a row of data cells for restoring the data to the cell which are rarely addressed must be refreshed periodically. The periodic refreshing of certain data cells is usually accomplished by the use of an internal address counter which sequences through all addresses at a minimum required rate to insure data preservation. For that embodiment, the counter is incremented each time. No external address is received. As a result, the external address source must reserve a number of times during which no address inputs are present for guaranteeing that the internal restored data can be refreshed.

A data cell is desired in which the speed of writing and reading into and from a cell is increased. In addition a preferred data cell should be designed for overcoming threshold losses through field effect transistors used in implementing the data cell. The present invention provides a data cell having the desired characteristics.

SUMMARY OF THE INVENTION

Briefly, the invention comprises at least one data cell which receives data from an input line and provides stored data on an output line. In certain embodiments, the data cell is connected to a common input/output line while in other embodiments, the cell is connected between adjacent input/output lines. During a first recurring interval of a read/write cycle, a first field effect transistor connected to a data line is turned on by a clock and a write address signal for applying a voltage representing a logic state, i.e., logic one or logic zero, to a storage capacitor when the data cell is addressed. The storage capacitor is also connected as a feedback capacitor between a first electrode and a gate electrode of a second field effect transistor for implementing a bootstrap circuit. The second electrode of the transistor is connected to a clock and a read address signal.

During a second phase recurring interval, the data line is recharged to a first voltage level. The first voltage level represents one logic state in the preferred embodiment. During a third phase recurring interval, the clock and read address signal is applied to the second electrode of the second transistor when the cell is addressed. If a logic one had been previously stored by the cell, the second field effect transistor would turn on and the voltage appearing on its first electrode would be fed back for enhancing the conduction of the field effect transistor.

The "bootstrap " circuit thus enables the transistor to overcome its threshold losses so that the voltage level on its first electrode is substantially equal to with voltage on its second electrode. The increased voltage level on the first electrode provides a drive voltage to the gate electrode of a third field effect transistor connected between the data line and electrical ground.

If a logic one had been stored by the cell, the data line would be connected to electrical ground for discharging the line. If a logic zero had been previously stored, the third field effect transistor would remain off and the data line would not be discharged. The data appearing on the data line at the end of the third interval is therefore the inverse of the data stored by the data cell.

During the first recurring interval of the following data refresh cycle, the data is reinverted and re-stored in the data cell. If the cell is addressed, however, the refresh cycle is omitted to permit external data to be store in an addressed cell.

Therefore, it is an object of this invention to provide a bootstrapped inverter memory cell for a memory system.

It is another object of this invention to provide a data cell implementing a memory system requiring a relatively shorter data read/write times.

A still further object of this invention is to provide a memory cell in which a storage capacitor also provides feedback for overcoming the threshold loss of a field effect transistor implementing the data cell as a function of the data stored by the cell.

It is another object of this invention to provide an improved storage circuit in which the impedance between a data line to electrical ground is reduced when reading information from the storage circuit.

It is another object of this invention to provide a high speed read/write (RAM) data cell for a memory system.

These and other objects of this invention will become more apparent when taken in connection with the drawings, a brief description of which follows.

DESCRIPTION OF PREFERRED EMBODIMENTS

Figure 1:
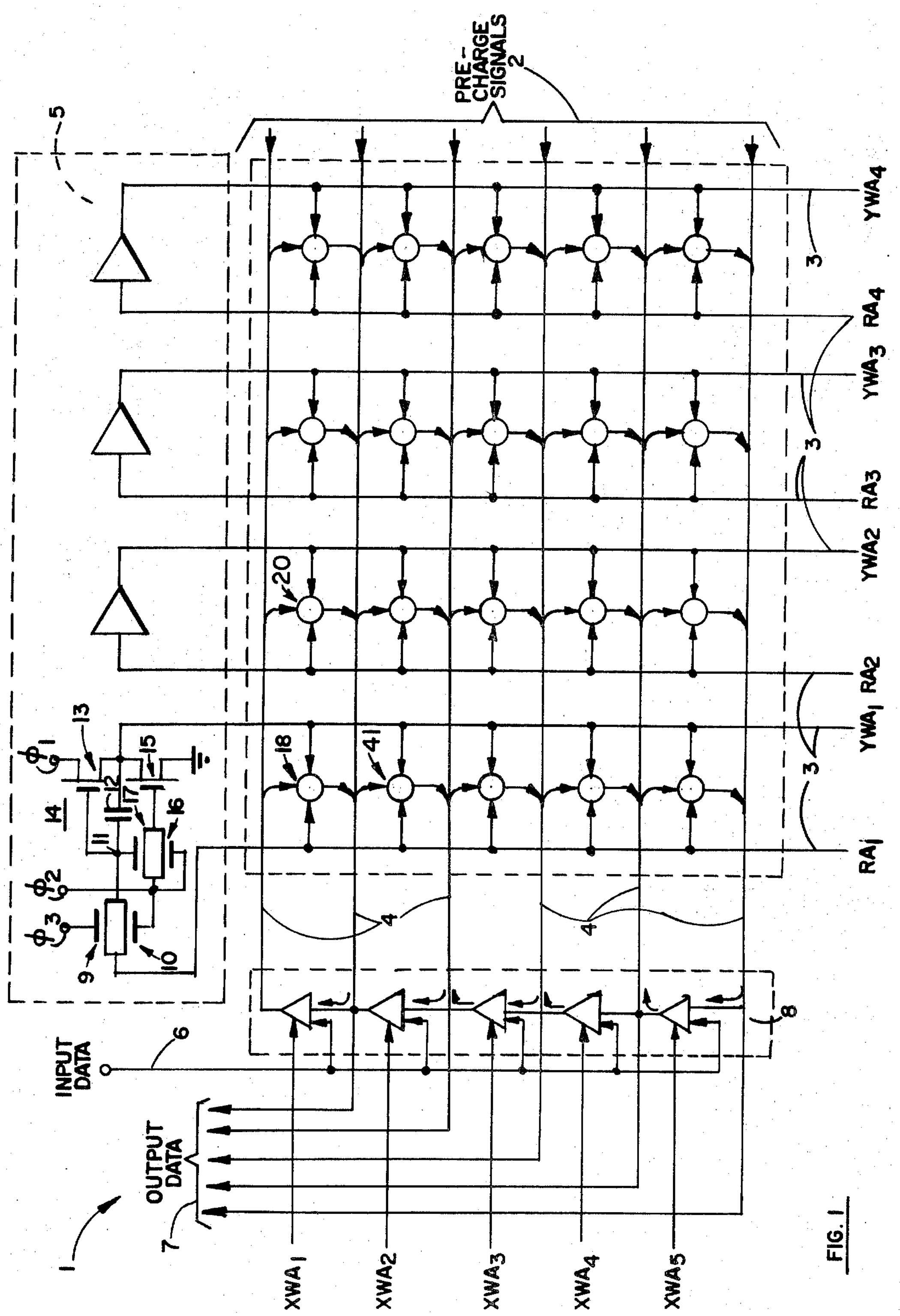
FIG. 1 is a schematic diagram of a read/write memory system including data storage cells, refresh circuits for each column of data storage cells, input and output logic.
Figure 2:
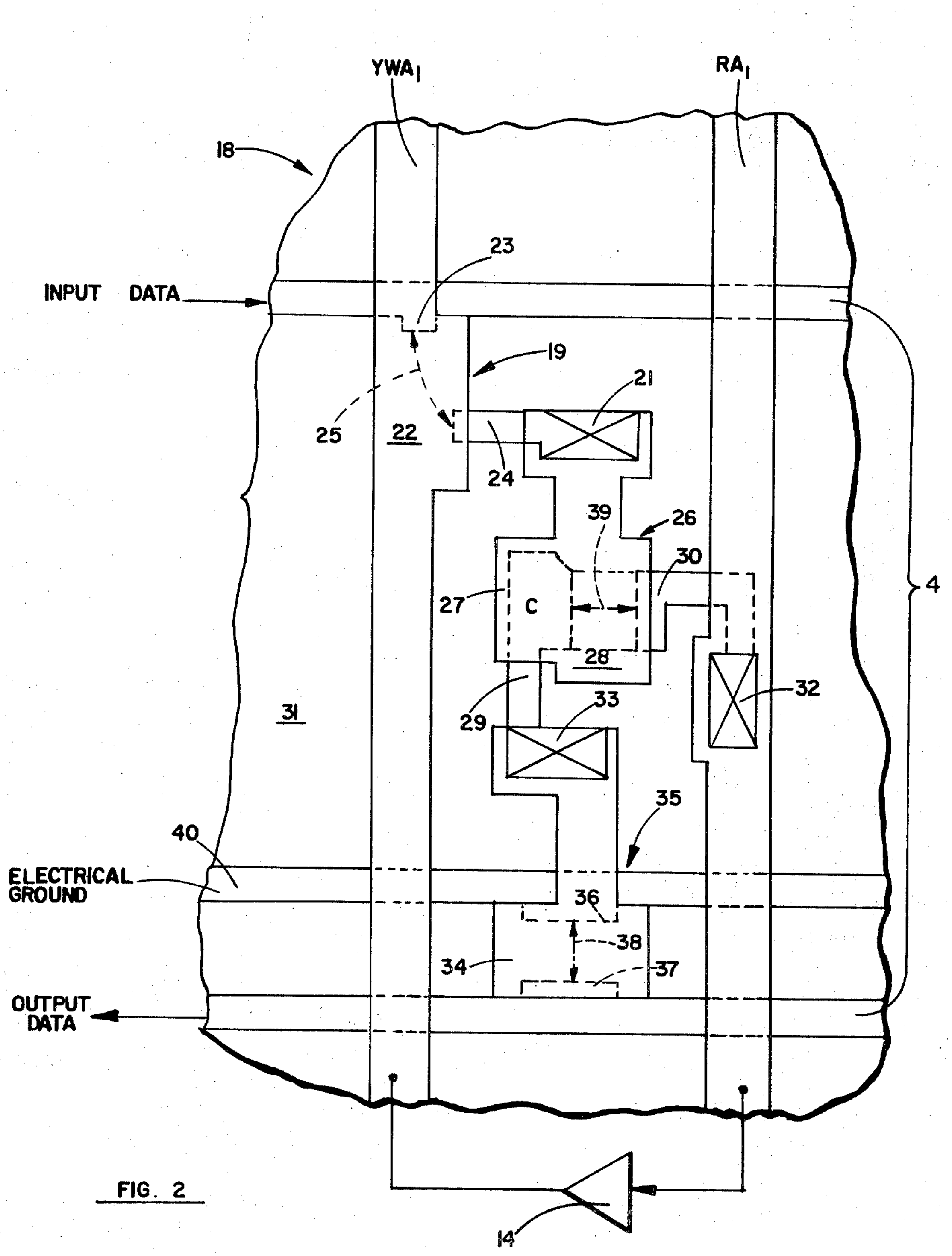
FIG. 2 is a schematic diagram of a portion of one column of data cells and refresh circuitry which can be used to implement the FIG. 1 system.

FIG. 1 is a schematic diagram of a read/write memory system 1 comprising a plurality of memory cells identified generally by the numeral 2. The memory cells, shown in detail in FIG. 2, are interconnected between plurality of conductors 3 and 4 forming an XY matrix. The coincidence of signals on the conductors enable selected ones of the data cells to be addressed. The Y axis read/write address signals (RA, YWA, $-$ $RA_4$, $YWA_4$) are provided on the plurality of conductors 3. The X axis address signals, input and output data, refresh data are provided on the plurality of conductors 4. The X axis address signals, $XWA_1$ $-$ $XWA_5$, are provided from an external source such as X address decode logic. The input data on line 6 is also provided from a separate part (not shown) of the memory system The output data on lines 7 may be processed by logic and output driver and used for example in a computation operation.

The input data and X address signals are received by plurality of data refresh cells 8 which also include logic gates for refreshing (restoring) data stored in the cells during a data a data refresh cycle or periodically as required to prevent data loss due to leakage etc. The periodic updating or refreshing of the data is usually controlled by a separate counter (not shown). An embodiment of one refresh cell is shown and described in connection with FIG. 2. For the embodiment shown, read address signals, e.g., $RA_1$ are delayed an interval of time by the plurality of delay circuits identified generally by the numeral 5 and are used as Y axis write address signals, e.g., $YWA_1$, for the memory system 1. A specific embodiment of one delay circuit 14 is shown between the $RA_1$ and $YWA_1$, address lines.

The delay circuit includes parallel connected field effect transistors 9 and 10 gated respectively by clock signal $\phi_3$ and $\phi_2$. The $\phi_3$ clock signal represents a read clock and the $\phi_2$ clock signal transistors 9 and 10 are connected between node 11 and read address line, $RA_1$. The signal on the read address line either discharges capacitor 12 or enables it to remain charged and to act as a feedback capacitor for field effect transistor 13. The capacitor and transistor implement a bootstrap circuit connected between $\phi_1$ clock signal and the Y address line $YWA_1$. The $\phi_1$ clock represents a write clock.

Field effect transistor 15 connected between $YWA_1$ and ground complete the output stage of circuit 14. Its gate electrode is connected to the output from field effect transistor pair 16 and 17. Transistor 16 is gated by clock signal $\phi_2$ and transistor 17 is gated by the signal on node 11.

In operation, field effect transistor 10 and 16 are turned on during $\phi_2$ time for discharging capacitor 12 and the inherent capacitance at the gate electrode of field effect transistor 15. The capacitances may be charged to a true, or logic one state, for the embodiment shown during the $\phi_3$ interval.

Figure 3:
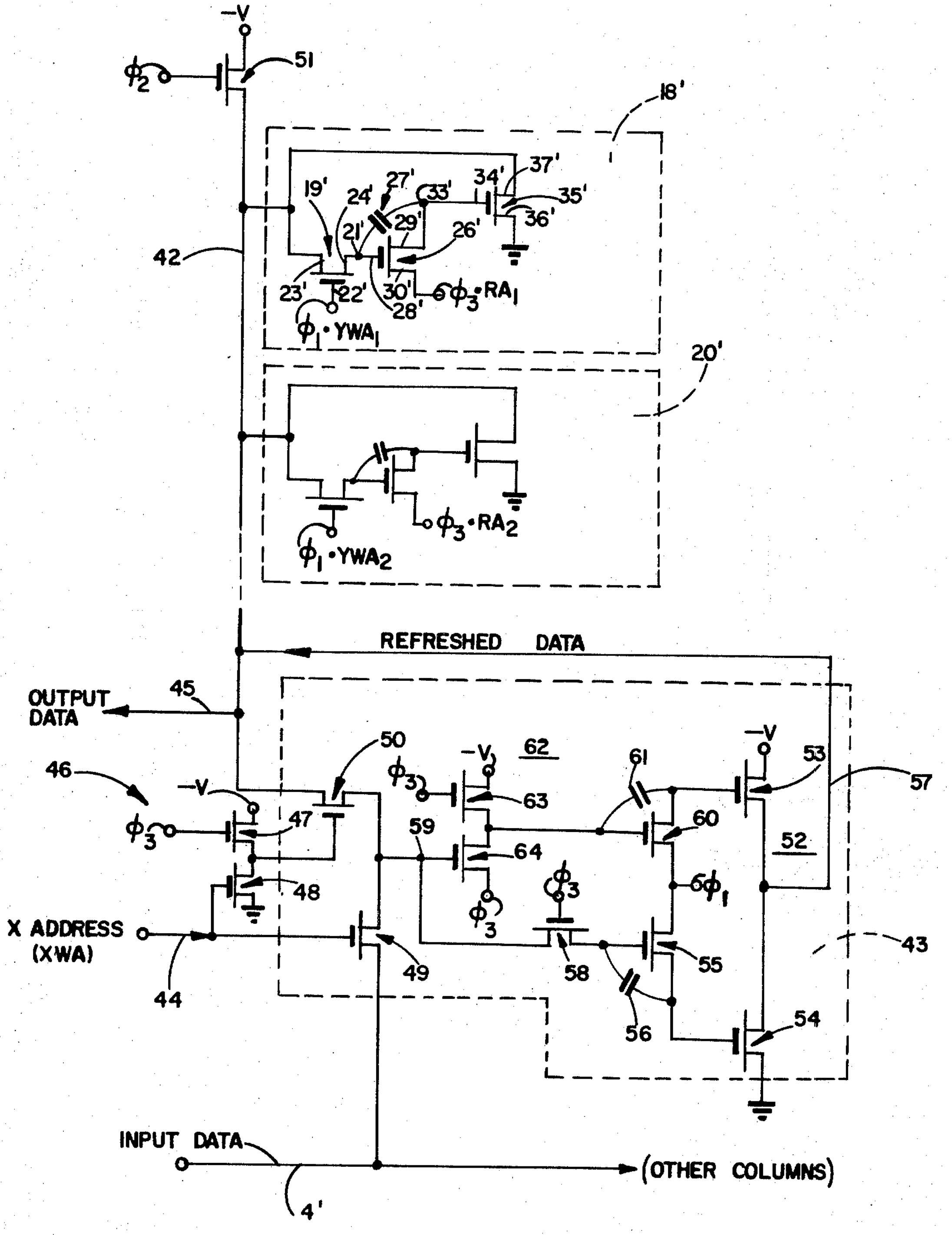
FIG. 3 is a diagram of clock read/write address signals, and data signals on the input/output line for the FIG. 2 circuit.

During $\phi_3$, if the $RA_1$ line receives a true address signal, transistor 9, conductive during $\phi_3$, applies the signal to node 11. Field effect transistor 15 is turned off since the charge on its gate electrode was discharged to ground at the end of $\phi_2$ by the conduction of transistor 17. Therefore, transistor 17 is conductive during $\phi_3$. However, since $\phi_1$ is ground, the $YWA_1$ line is at electrical ground, representing a false or logic zero state for the embodiment shown. As a result, information can be read out of one of the storage cells connected to $RA_1$ during $\phi_3$ while the write function is inhibited. Thereafter during $\phi_1$, transistor 9 and 10 are off and transistor 13 is rendered conductive by the voltage stored on capacitor 12. The $\phi_1$ signal initially appearing on $YWA_1$ is reduced by the threshold loss through transistor 13. However, the feedback through capacitor 12 to the gate electrode of transistor 13 enhances the conduction of the transistor for overcoming the threshold loss through the device. As a result, during $\phi_1$, the $\phi_1$ clock signal level is provided on $YWA_1$ for writing (or refreshing) data in an addressed cell connected to the $YWA_1$ line. If the $RA_1$ signal is false during $\phi_3$ the $\phi_1$ signal is blocked from $YWA_1$ during $\phi_1$ and the line is connected to electrical ground during $\phi_1$ by transistor 15. In effect the RA and YWA lines are ANDED with the $\phi_3$ and $\phi_1$ clock signals respectively as shown in FIG. 3.

Briefly the system shown in FIG. 1 stores data in a cell receiving XWA and YWA address signals during $\phi_1$. Input data for all the cells is receiving on line 6. During $\phi_2$ of the read/write cycle, the lines 4 are precharged by a precharge signal. The precharge signals are blocked from the output by other circuitry (not shown). During $\phi_3$, an addressed cell provides a read out of data previously stored on one of the output lines 7. The data such as a logic one or logic zero data bit, is processed through circuitry for its required use.

The incoming data is in effect ORed with output data through one of the cells except that incoming data blocks the recirculation or refreshing of data read out. In other words, often each read/write cycle readout data is refreshed unless external input data is received.

FIG. 2 represents an actual layout of the data storage cell 18 shown schematically in FIG. 1. The cell comprises write field effect transistor 19 connected between data line 4 which provides input data to the cell and contact 21. Adjacent data line 4 receives output data from the cell when it is addressed and provides input data to an adjacent cell such as cell 41 in FIG. 1 when that cell is addressed. The gate electrode 22 of the transistor 19 controls conduction between, for example, P region 23 of data line 4 forming one electrode of transistor 19 and P region 24 forming the other electrode of transistor 19. The conduction channel between the regions 23 and 24 is identified by the dashed line 25.

The cell also comprises bootstrapped field effect transistor 26 including feedback and storage capacitor 27 connected between gate electrode 28 and P region 29 forming one electrode of transistor 26. The other electrode of the transistor utilizes P region 30. The gate electrode and the upper plate of the capacitor are implemented by a metal conducting layer disposed over and insulated from the underlying semiconductor substrate 31 in which the cells are formed. P region 30 is contacted by the $RA_1$ line as shown by contact 32. The address lines RA and YWA are also implemented by conducting metal strips for the embodiment shown.

P region 29 of transistor 26 is contacted by contact 33 to which is an extension of gate electrode 34 of field effect transistor 35. When the transistor is on, conduction between P region 36 and 37 occurs in the channel identified by dashed line 38. The channel of transistor 26 is identified by numeral 39. Region 36 is an extension of the electrical ground 40 line whereas region 37 is an extension of the adjacent data line 4 for providing readout data from the cell 18. Delay circuit 14 is shown schematically connected between the read and write address lines. In FIG. 1, the delay circuit is shown at a slightly different location from the position in FIG. 2. The FIG. 2 location is selected for convenience only.

The operation of the FIG. 2 embodiment storage cell is substantially similar to the operation of the FIG. 3 embodiment shown in a schematic form. The only difference between the embodiments is that the input and output data is transmitted on one data line 4 and not two data lines 4 as shown in FIG. 2. The description of operation of the FIG. 2 data cell is, in effect, given in connection with FIG. 3 and 4.

FIG. 3 is a schematic diagram of data storage cells 18'' and 20' connected to a data line 42 for the input/output data. Other storage cells have been omitted for convenience as shown by the dashed portion of line 42.

Data refresh cell 43 is connected at one end of line 42 for receiving input data on line 4' when the X column of storage cells is addressed on line 44. The refresh cell 43 also receives data from line 42 after each read interval for restoring the data in an addressed cell. Periodically, the stored data in each cell is restored or refreshed to prevent data loss as previously explained.

Output data from the cells is provided on line 45 shown distinct from input line 4'. In other embodiments, the lines may be connected since input data and output data are transmitted during different clock intervals.

Logic gate 46 comprising field effect transistors 47 and 48, connected between -V and electrical ground, enable the refresh cell to process input data through field effect transistor 49 while blocking the output data from being recirculated through field effect transistor 50.

In operation during the read interval, $\phi_3$, when line 44 is true for enabling data on line 4'' to be stored during a subsequent $\phi_1$, transistor 48 is conductive. As a result, the gate electrode of transistor 50 is connected to ground for turning transistor 50 off. The true signal on line 44 turns transistor 49 on. If the signal on line 44 is false, transistor 49 is off (48 off) and transistor 50 is turned on.

Field effect transistor 51 connected between line 42 and −V provides a precharge voltage to the line during $\phi_2$. The transistor is turned on during $\phi_2$.

Since the data storage cells are substantially identical, only cell 18' is described in detail. It should be understood that the other cells have the same circuit elements. The four address signals are different for each cell.

Storage cell 18' includes field effect transistor gated by write address signals, $\phi_3 \cdot YWA_1$ connected to the gate electrode 22' of the transistor which has one electrode 23' connected to line 42 and its other electrode 24' connected to contact 23'. Field effect transistor 26' has one electrode 30' connected to read address signal $\phi_3 \cdot RA_1$ and its other electrode 29' connected to contact 33'. Its gate electrode 28' is connected to contact 21'.

Capacitor 27' is connected between electrode 29' and gate electrode 28' of transistor 26' for storing voltage levels representing logic data during $\phi_1$ for feeding back voltage levels on electrode 29 to the gate electrode during $\phi_3$ as a function of the voltage levels stored on the capacitor. For example, if logic 1 data is stored by the capacitor, during the $\phi_3$ read interval, transistor 26' is conductive and the read signal $\phi_3 \cdot RA_1$ (reduced by one threshold) is feedback across the capacitor for enhancing the conduction of transistor 26' for overcoming the threshold loss. The increased voltage on contact 33' enables field effect transistor 35 to respond more rapidly. As a further result, the output voltage level on line 42 is not a function of two threshold losses, i.e., through 35' and 26'. Therefore the voltage levels can be controlled to an improved degree within readily usable limits such as −V and electrical ground.

Field effect transistor 35' has its electrode 36' connected to electrical ground and its electrode 37' connected to line 42. Transistor 35' controls the voltage level of the read-out data during $\phi_3$ as a function of the data stored by capacitor 27'. For example, if capacitor 27' stores logic one data, transistor 35' is turned on to provide a logic zero output. If capacitor 27' stores logic zero data, transistor 35' remains off and enables line 42 to provide a logic one output.

The refresh cell 43 includes a push-pull output stage 52 comprising field effect transistors 53 and 54 connected between −V (representing logic one data) and electrical ground (representing logic zero data). Transistor 54 is controlled by bootstrap transistor 55 which includes feedback capacitor 56. When transistor 55 conducts, clock signal $\phi_1$ is applied to the gate electrode of transistor 54 to provide a logic zero output on line 57. The gate electrode of transistor 55 receives drive signals through sampling field effect transistor 58 from node 59. Transistor 58 is gated by $\phi_3$.

Transistor 53 is controlled by bootstrap transistor 60 which includes feedback capacitor 61. When transistor 60 conducts, clock signal $\phi_1$ is applied to the gate electrode of transistor 53 to provide a logic one output on line 57. The gate electrode of transistor 60 also receives drive signals from node 59 through in-between phase inverter 62 comprising field effect transistors 63 and 64 connected between −V and $\phi_3$. Transistor 63 is gated by $\phi_3$ and transistor 64 receives its drive signals from node 59.

The operation of the FIG. 2 circuit can best be understood by referring to the signal diagram of FIG. 3. It should be understood that the description of the operation also applies to other data cells comprising the plurality of data cells 2 shown in FIG. 1.

In operation, during $\phi_1 \cdot YWA_1$, field effect transistor 19' is turned on and the voltage level on data line 42 is applied to capacitor 27'. The data line is assumed to be at electrical ground representing logic zero. Field effect transistor 51 is turned off since $\phi_2$ is at electrical ground during $\phi_1$. The voltage on electrode 30' of field effect transistor 26' is at electrical ground since $\phi_3 \cdot RA_1$ is at electrical ground during $\phi_1$.

During $\phi_2$, field effect transistor 51 is turned on for applying −V to the data line and to node 59 for turning field effect transistor 64 of between phase inverter 62 on. However, since $\phi_3$ is at electrical ground during $\phi_2$, the application of −V to node 59 does not effect the operation of the refresh cell 43. The capacitance (not shown) along the data line 42 is charged approximately to −V. The term "precharge" refers to the charging of the capacitance.

At the end of $\phi_2$, $\phi_3 \cdot RA_1$ becomes true (assuming data cell 18' is addressed). The $\phi_3 \cdot RA_1$ signal is identified by numeral 65 in FIG. 3. The $\phi_1 \cdot WA_1$ signal is identified by numeral 66 and the $\phi_2$ clock signal is identified by numeral 67. The voltage levels (logic states) on the data line 42 are identified by the numerals 68 and 69. Numeral 68 identifies the voltage levels on line 42 when a logic 0 is stored in the data cell and numeral 69 identifies the voltage level when a logic one is stored. The read/write cycle is identified as comprising $\phi_1 \cdot WA_1$, $\phi_2$, and $\phi_3 \cdot RA_1$ and the refresh cycle following the read/write cycle is identified as comprising the same signal intervals.

During $\phi_3 \cdot RA_1$, a negative voltage level is applied to electrode 30' of field effect transistor 26'. However, assuming a logic zero state stored by capacitor 27' during $\phi_1 \cdot YWA_1$, field effect transistor 26' does not become conductive. As a result, no drive voltage is applied to gate electrode 34' of field transistor 35'. Therefore, the data line 42 does not discharge to electrical ground. It remains precharged to approximately −V.

Figure 4:
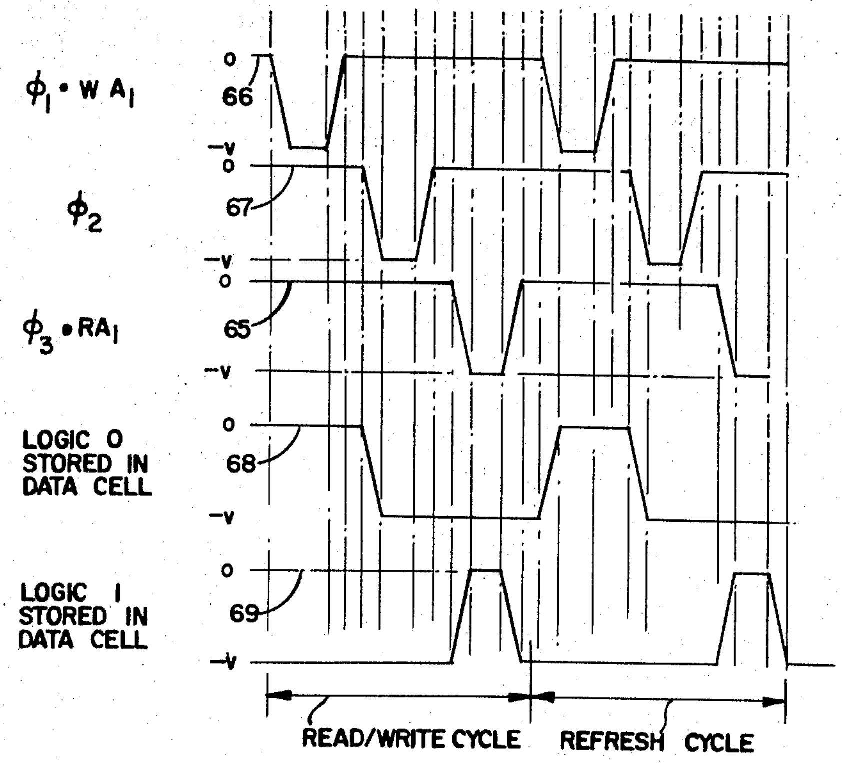
FIG. 4 is a representation of a layout of a record embodiment of a memory cell which can be used to implement the data cells of the FIG. 1 memory system.

As shown by signal 68 in FIG. 4, at the beginning of the $\phi_2$ phase, the data line 42 changes from electrical ground to approximately −V. Since it did not change during $\phi_3 \cdot RA_1$, it remained at approximately −V until the beginning of the refresh cycle.

During $\phi_1 \cdot WA_1$ of the refresh cycle, the data in cell 18 is refreshed, or restored to its prior voltage level, i.e., electrical round (logic zero) when field effect transistor 19' is turned on.

Field effect transistor 50 was turned on during $\phi_3$ of the read/write cycle to charge capacitor 56 to the approximately −V voltage level on data line 42 through transistor 58. During $\phi_1$ of the refresh cycle, transistor 55 is turned on for providing the $\phi_1$ voltage level to the gate electrode of field effect transistor 54. Transistor 54 is turned on for connecting line 57 to electrical ground. The electrical ground voltage level is applied through transistor 19' to capacitor 27' as indicated above for refreshing, or restoring, the read out data. Data line 42 is discharged to ground through transistor 54 in restoring the logic zero state in cell 18'. The change in the signal 68 from −V to ground is shown in FIG. 4 for $\phi_1 \cdot WA_1$ of the refresh cycle.

The data line 42 remains at electrical ground until $\phi_2$ when field effect transistor 51 turns on for precharging line 42 to approximately −V. The change in voltage levels is shown in FIG. 4 as occurring during $\phi_2$ of the refresh cycle.

During $\phi_3$, field effect transistor 26' and therefore field effect transistor 35' remain off and the line remains at −V. The cycle then repeats.

When a logic 1 is stored in data cell 18', the data line 42 changes as shown by signal 69 of FIG. 4. During $\phi_1 \cdot WA_1$, field effect transistor 19' is turned on and −V is applied across capacitor 27'. Field effect transistor 26' is turned on and electrode 29' is connected to the electrical ground level on electrode 30' of transistor 26' during $\phi_1$. $\phi_3 \cdot RA_1$ is at electrical ground during $\phi_3$ as illustrated by signal 65. Therefore capacitor 28 charges to approximately −V during $\phi_1 \cdot WA_1$.

During $\phi_2$, data line 42 is recharged to approximately −V. However, since the line was already at −V, no change occurs in signal 69.

During $\phi_3 \cdot RA_1$, the signal on electrode 30' becomes true and field effect transistor 26' is rendered conductive by the voltage on capacitor 27'. The voltage on electrode 29' is fedback across capacitor 27' to gate electrode 28' for enhancing the conduction of field effect transistor 26'. As a result of the increased voltage on gate electrode 28', the threshold loss across transistor 26' is substantially reduced and the drive voltage on the gate electrode of field effect transistor 35' is increased to approximately the voltage level of $\phi_3 \cdot RA_1$ on electrode 30'. Field effect transistor 35' is turned on for connecting data line 42 to electrical ground. The connection of the data line 42 to electrical ground is shown by the signal 69 changing from approximately −V at the beginning of $\phi_3 \cdot Ra_1$ to electrical ground.

In addition, field effect transistor 50 was on during $\phi_3$ for applying electrical ground to node 59. Electrical ground has no effect on transistor 55. However, the electrical ground is inverted by inverter 62 and applied to capacitor 61. During $\phi_1 \cdot WA_1$ of the refresh cycle, field effect transistor 60 is turned on and the $\phi_1$ voltage level is applied to the gate electrode of transistor 53. As a result, −V is applied to line 57 and line 42. Signal 69 changes during $\phi_1$ from electrical ground to −V. −V. is applied through field effect transistor 19' to capacitor 27' for restoring the read-out data.

During $\phi_2$ the line remains at −V. However during $\phi_3 \cdot RA_1$ the line is again discharged to ground.

Data received on the data input line is processed through the refresh cell in a manner similar to the processing of data for refreshing purposes. Logic one data is processed through one channel, i.e., bootstrapped driver and logic zero data is processed through the other channel, i.e., the other bootstrapped driver.

For purposes of describing one embodiment, p channel enhancement field effect transistors were used. It should be understood that other semiconductor devices can also be used. For example, devices which can be used to implement the present invention include MOS, MNOS, silicon gate, depletion mode, etc. Complementary field effect transistors may also be utilized. It should be understood that different logic conventions may be required for processing data in the event different types of field effect transistors are utilized.

I claim:

1. A data storage cell comprising, a storage capacitor, first, second and third field effect transistors, said first and said third field effect transistors connected in electrical series between a reference voltage level and the gate electrode of said second field effect transistor, said storage capacitor connected between the gate electrode of said second field effect transistor and the gate electrode of said third field effect transistor, a data line connected at a common point between said first and third field effect transistors, said second field effect transistor connected between a first clock signal and the gate electrode on said third field effect transistor.

2. The data storage cell recited in claim 1 wherein said first clock signal is a recurring read clock signal said first field effect transistor includes a gate electrode connected to a recurring write clock signal for actuating said first field effect transistor during said recurring write interval, said second field effect transistor conducting said recurring read clock signal to the gate electrode of said third field effect transistor during said recurring read interval as a function of the data stored on said storage capacitor, said third field effect transistor having its second electrode connected to a voltage level for representing one logic state, said one logic state being provided as an output from said storage cell when a voltage level representing a second logic state is stored by said storage capacitor.

3. The data storage cell recited in claim 2 and further wherein said data line provides input and output data.

4. The data storage cell recited in claim 2 further including a plurality of common lines for input and output data, said data storage cell connected between adjacent lines with a first electrode of said first field effect transistor connected to one line for receiving input data, and a first electrode of said third field effect transistor connected to an adjacent line for providing output data.

5. The data storage cell recited in claim 2 further including refresh circuitry means receiving output data from said storage cell, said refresh circuitry including means for inverting said data and providing said inverted data as an input to said storage cell during the write interval of a data refresh operating cycle.

6. The refresh circuitry recited in claim 5 including a blocking field effect transistor for interrupting the flow of output data into said refresh circuitry means when said storage cell is being externally addressed for enabling new data to be stored by said storage cell.

7. The refresh circuitry recited in claim 6 further including two channels including a common output connection between said channels, said common connection being connected to common line, a first of said channels inverting logic data representing one logic state for providing an output on said common output terminal, a second channel inverting logic data of a second logic state for providing an output on said common output terminal.

8. The data storage cell recited in claim 1 wherein said data storage cell comprises one of a plurality of data storage cells connected to data line, said data line providing a common conductor for input and output data, a fourth field effect transistor connected to said common input/output data line for charging said line to a first voltage level representing one logic state during a precharge interval between said read and write intervals, said third field effect transistor connected to said common input/output data line for either connecting said data line to said reference voltage level or for isolating said data line from said reference voltage level during said read interval as a function of the logic state of the data stored by said cell.

9. The data storage cell recited in claim 1 wherein said data storage cell comprises one of a plurality of data storage cells connected between adjacent input/output data lines, means for providing data to be written into an addressed data storage cell from one input/output data line and means for receiving output data from an addressed data storage cell on an adjacent input/output data line.

10. The data storage cell recited in claim 1 further including means for providing a read signal to an addressed data cell during a read recurring interval including delay circuitry for delaying said read signal for one interval for converting said read signal to a write signal.

11. A data storage circuit comprising, a first field effect transistor having a first electrode for receiving data being stored and for receiving refreshed data previously stored, and having a second electrode, said first field effect transistor having its gate electrode connected to a write signal, a second field effect transistor having a first electrode connected to electrical ground representing one logic state and a second electrode connected to control output voltage levels representing first and second logic states, said second field effect transistor providing an output voltage level representing the inverse logic state of the data stored by said data cell, a third field effect transistor having a first electrode connected to a read signal and having its gate electrode connected to the second electrode of said first field effect transistor and having a second electrode connected to the gate electrode of said second field effect transistor, a storage capacitor connected between the gate electrode and second electrode of said third field effect transistor for storing voltage levels representing the logic states of data being stored by said data storage circuit and for providing a feedback voltage from the second electrode of said third field effect transistor to the gate electrode of said third field effect transistor during said read interval for enhancing the conduction of said third field effect transistor when data of said second logic state is stored on said capacitor, the enhanced conduction of said third field effect transistor providing a relatively higher drive voltage on the gate electrode of said second field effect transistor for increasing the speed of operation of said data storage cell.

12. The data storage circuit recited in claim 11 including a common input/output line for said data, and a precharge field effect transistor for charging said input/output line to a voltage level representing a first logic state during an interval between said write and read operating intervals, said input/output line being discharged or remaining charged as a function of the state of said stored data during said read interval.

13. The data storage circuit recited in claim 12 including circuitry means for restoring the voltage level of the data stored by said storage capacitor following each read interval, and periodically when said storage cell is not frequently addressed.

* * * * *